July 2, 1963 M. ROSENBERG ETAL 3,096,509
MAGNETIC-CORE COUNTER
Filed May 16, 1960
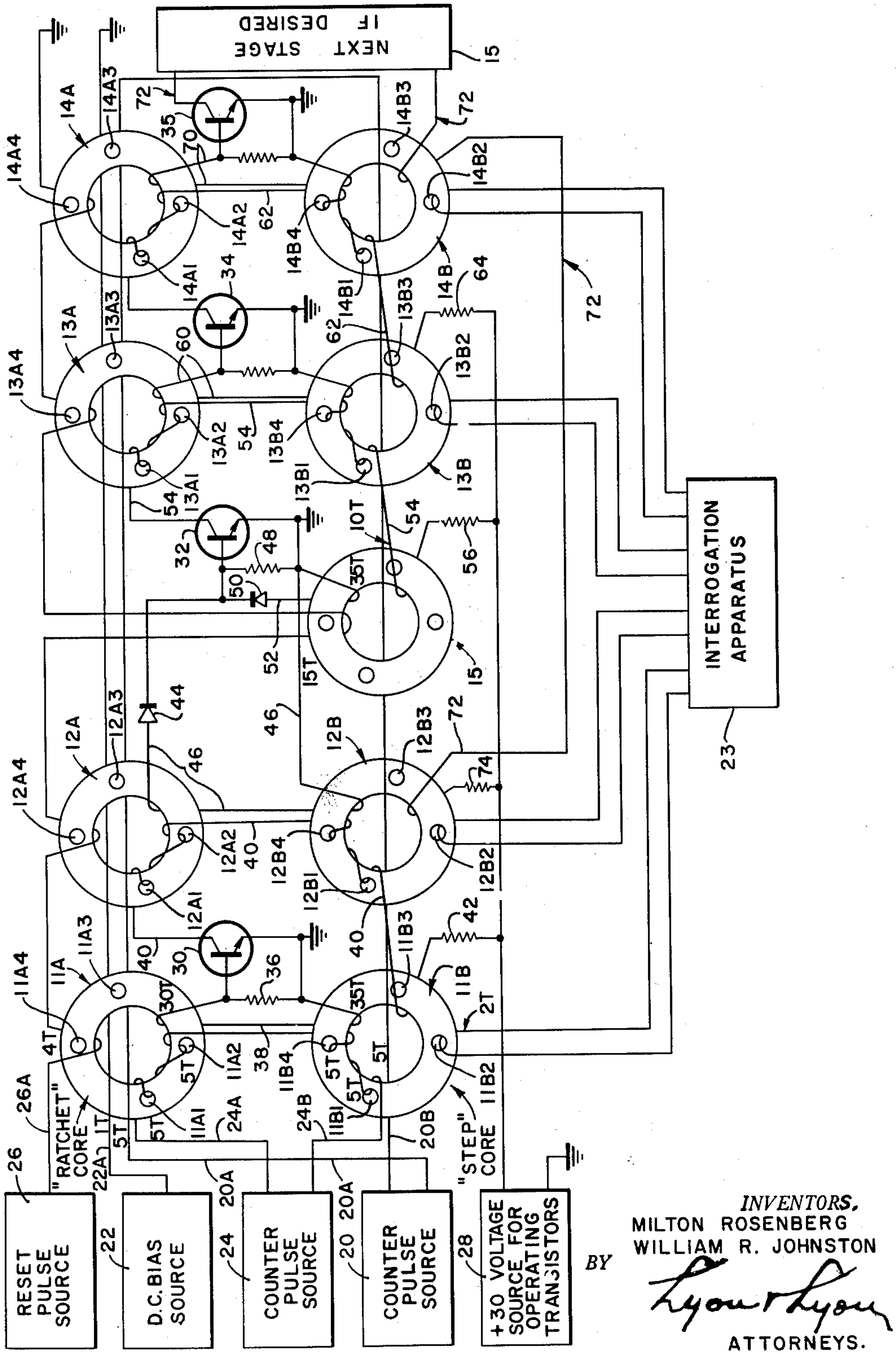
INVENTORS.
MILTON ROSENBERG
WILLIAM R. JOHNSTON
BY Lyon & Lyon
ATTORNEYS.

United States Patent Office 3,096,509
Patented July 2, 1963

3,096,509
MAGNETIC-CORE COUNTER

Milton Rosenberg, Santa Monica, and William R. Johnston, Los Angeles, Calif., assignors, by mesne assignments, to Ampex Corporation, Redwood City, Calif., a corporation of California Filed May 16, 1960, Ser. No. 29,193
6 Claims. (Cl. 340—174)

This invention relates to counters and, more particularly, to an all solid-state counter.

An object of this invention is to provide a solid-state counter employing multi-aperture ferrite cores and transistors.

Another object of this invention is to provide a counter wherein current flows only during the count and reset periods.

Still another object of the present invention is to provide a counter which is operable over a wide temperature range.

Yet another object of the present invention is to provide a counter which is not affected by wide variations in supply voltage or in driving-pulse amplitudes, and, further, which retains the count information therein, even with a loss of supply voltage.

Yet another object of the present invention is the provision of a solid-state counter which is operable even in the presence of bombardment by radiation particles.

These and other objects of the invention are achieved in an arrangement wherein two magnetic cores are employed for each stage of the counter. Coupling between stages is effectuated by a transistor, which is actuated to drive a succeeding stage of the counter when the immediately preceding stage with which it is coupled receives a pulse, which will reset that stage from its one to its zero state. At that time the transistor drives both cores of the succeeding stage of the counter to their one states and returns the immediately preceding stage to its zero state. Provision is also made by inserting an extra magnetic core between the second and third stages of the counter to effectuate a binary-coded decimal operation of the counter.

The novel features that are considered characteristic of this invention are set forth with particularity in the appended claims. The invention itself, both as to its organization and method of operation, as well as additional objects and advantages thereof, will best be understood from the following description when read in connection with the accompanying drawing, which is a circuit diagram of an embodiment of the invention.

This invention employs magnetic cores of the type which are toroidal in shape and wherein there are small apertures in the toroid-ring material surrounding the main aperture. The portion of the toroid ring between the main aperture and small aperture is known as the inner leg. The portion of the toroid ring between the small aperture and outer periphery is known as the outer leg. The operation of multiaperture cores, as these magnetic-core types are called, are well known and are described in the literature. For example, see an article entitled "A High-Speed Logic System Using Magnetic Elements and Connecting Wires Only," by Hewitt D. Crane, published in the January 1959 issue of the I.R.E. Proceedings, page 63.

Reference is now made to the drawing, which shows a circuit diagram of the embodiment of the invention. Shown by way of illustration is a four-stage counter. This is not to be construed as a limitation upon the invention, since those skilled in the art will readily recognize from the description of this invention that the counter can be made to have any desired length or count capacity.

As will become apparent from the description of the invention, current flows only during the time that a count is being entered into the counter. At this time, at most only three cores are being driven by a transistor, and, therefore, the counter presents no problem of a varying load upon the source of driving current.

All the stages of the counter employ two cores. Thus, the first stage of the counter employs the two cores 11A, 11B. The second stage of the counter employs the two cores 12A, 12B. The third stage of the counter has the two cores 13A, 13B, and the fourth stage of the counter has the two cores 14A, 14B. The core 15, which is inserted between the second and third stage of the counter, serves the purpose of converting this counter to a binary-coded decimal-type of counter. Actually, for straightforward binary operation, the core 15 is not needed; it may be omitted, as will become apparent from the further description of this invention. The cores 11A, 12A, 13A, and 14A are called herein ratchet cores, and the cores 11B, 12B, 13B, and 14B are called herein the step cores. Each one of these cores has preferably substantially rectangular hysteresis characteristics, whereby it may be said to have two stable states of magnetic remanence. One of these is designated as the "clear" state and the other as the "set" state. Alternatively expressed, when a core is in the clear state, it is storing zero and when it is in the set state it is storing one.

This counter operates initially with all the cores in the clear state. To achieve this, a clear counter pulse source 20 drives a clearing winding 20A, 20B. A first half 20A of the clearing winding threads through the main apertures of all the A cores in the counter and then a second half 20B returns back to the clear counter pulse source through the main apertures of all the B cores in the counter. There is also employed a D.C. bias source 22, which has a bias winding 22A which threads through all the main apertures of the A cores in the counter. The function of this source is to provide a D.C. operating level for the A cores, which is the same as the D.C. operating level established for the B cores by bias (not shown) applied from interrogation apparatus 23.

Pulses are applied to be counted from a count pulse source 24. These are applied only to the cores in the first stage, respectively, 11A and 11B, through a winding 24A, which threads through the main aperture of the core 11A, then through the small aperture $11A_1$, thereafter through the main aperture of core 11A, then through a second small aperture $11A_2$, thereafter through the main aperture of the core 11A, then down through the main aperture of the core 11B, through the small aperture $11B_4$, then through the main aperture of the core 11B again, thereafter through the small aperture $11B_1$, and through the main aperture of core 11B, via the winding half 24B, back to the count pulse source 24. Another pulse source required is a reset pulse source 26, which is coupled by means of a winding 26A to all of the cores 11A, 12A, 13A, and 14A through their main apertures. The purpose of the reset pulse source will become clear as the description of this invention progresses.

A voltage source 28 for operating transistors is provided so that each one of the transistors 30, 32, 34, 36, which are employed with this embodiment of the invention, can operate to drive cores to their clear state in a manner which will become clearer subsequently herein. The transistor 30 has its base connected through a resistor 36 to ground. The base is also connected to a coil 38, which passes through the main aperture of the core 11A, then through the main aperture of the core 11B, back to ground. The emitter of the transistor 30 is connected to ground, and the collector is connected to a coil 40, which passes through the main aperture of the core 12A, then through the small aperture $12A_1$, then back through the main aperture of core 12A, through a small aperture $12A_2$, then down through the main aperture of core 12B, through the small aperture $12B_4$, then through the main aperture again, and thereafter through the small aperture $12B_1$. The coil 40 then extends through the main aperture of core 11B, and thereafter is connected through a resistor 42 to the voltage source 28 for operating transistors.

Although the windings threading through the cores are shown as single-turn windings, it will be understood that this is done for the purpose of maintaining simplicity and clarity in the drawings. Actually, these windings have many turns upon the cores. The number of these turns on a magnetic ferrite-core counter which was built are represented by the small numbers adjacent the single-turn winding followed by a T. Thus, 5T designates five turns, 30T designates thirty turns, etc. These figures are to be taken as exemplary, and not as a limitation upon the invention. There has been described thus far two stages of a binary counter. If it were desired to extend the binary counter, then it is merely necessary to provide another transistor and two cores for each of the additional stages, and to interconnect each transistor to the cores of the additional stage in the manner exemplified by transistors 30 and cores 12A and 12B, and to connect the transistors to the preceding two cores in the manner exemplified by transistor 30 and cores 11A and 11B.

In order to effectuate a decimal-scale-type of operation, the core 15 is inserted. For a strictly binary operation, as has been previously pointed out, the core 15 is omitted. The transistor 32 is connected by means of a diode 44 to a winding 46, which is coupled to the core 12A through its main aperture, thereafter to the core 12B through its main aperture, and then is connected to ground. The base of the transistor 32 is also connected to ground through a resistor 48. The base of the transistor 32 is connected through a second diode 50 to a winding 52, which passes through the main aperture of the core 15, and then to ground. It should be noted that the reset winding 26A is also coupled to core 15 through its main aperture with a polarity to drive core 15 to its set state.

The collector of transistor 32 is connected to a winding 54, which passes through the main aperture of core 13A, thereafter through the small aperture $13A_1$, thereafter through the main aperture, and thereafter through the small aperture $13A_2$, and then through the main aperture of core 13A once more. The winding then extends through the main aperture of core 13B; thereafter, the winding 54 passes through the small aperture $13B_4$, thereafter through the main aperture of the core 13B, thereafter through the small aperture 13B. Thereafter, the winding 54 passes through the main aperture of the core 15, then through a resistor 56, back to the voltage source 28, for operating the transistors.

The transistor 34 is coupled to the cores 13A and 13B and to the cores 14A, 14B in the same fashion as was described for the transistor 30 with respect to cores 11A, 11B, 12A, and 12B. As previously pointed out, for a straightforward binary operation, the successive stages of a binary counter would have the couplings exemplified by these transistors and cores. Thus, the base of transistor 34 is connected to ground through a resistor 58. The base of transistor 34 is also connected to a winding 60. This winding 60 passes through the main aperture of core 13A, then down through the main aperture of core 13B, and then back to ground. The emitter of transistor 34 is connected to ground. The collector of transistor 34 is connected to a winding 62, which passes through the main aperture of core 14A, thereafter through the small aperture $14A_1$, thereafter through the main aperture, and thereafter through the small aperture $14A_2$. The winding 62 thereafter passes through the main aperture of the core 14A, and then down through the main aperture of core 14B. Thereafter, it passes through the small aperture $14B_4$, and thereafter through the main aperture. It then passes through the small aperture $14B_1$, and thereafter through the main aperture of core 14B again. Thereafter the winding 62 passes through the main aperture of the core 13B, and then through a resistor 64, to the transistor voltage source 28.

A transistor 35 has its base and emitter coupled to the cores 14A and 14B through the winding 70 in the same fashion as was described previously for transistors 30, 32, 34. The collector of transistor 35 is connected to the next stage 15 of the counter by a winding 72, if one is present. Otherwise, the winding 72 directly threads through the main aperture of core 14B, then through the main aperture of core 12B, then through resistor 74 to the voltage source for operating transistors. The sense of the coupling of winding 72 on cores 12B and 14B is such as to reset these cores to their clear states when transistor 35 is rendered conductive.

The operation of the counter is as follows. The first pulse from the count-pulse source, which in an embodiment of the invention was on the order of 500 mils applied for four microseconds duration, is applied to the winding 24A, 24B. It results in both cores 11A and 11B being driven from their clear to their set states. Winding 38 has one portion coupled to the core 11A and another portion coupled to the core 11B. However, the sense of the coupling of these portions to these respective cores is such as to provide an opposing output across the resistor 36. It should be noted, however, that the portion of the winding, which is coupled to the core 11B, has more turns (35 turns) than the portion of the winding coupled to the core 11A (30 turns). Thus, any output derived as a result of core 11B being driven is greater than any output derived as a result of core 11A being driven. The polarity of the excess output in this instance is such as not to affect the nonconducting state of transistor 30. After a count pulse, a reset pulse is derived from the source 26. This resets all the ratchet cores 11A, 12A, 13A, 14A to their clear states. It also drives core 15 to its set state. The polarity of the output from the portion of winding 38, which is coupled to core 11A when the core is driven to its clear state, is such as not to affect the conductive condition of the transistor 30.

The second count pulse drives core 11A from its clear to its set state. Core 11B is already in its set state, and therefore is not affected. When core 11A is driven to its set state, a voltage is induced in the winding 38, which has a sufficient amplitude to render transistor 30 conductive. Transistor 30, through the winding 40, drives both cores 12A and 12B to their set states and also drives core 11B to its clear state in a blocking oscillator action. The next reset pulse from the source 26 returns core 12A to its clear state. Thus, after the second count cycle is concluded, core 11B is in its clear state, core 12B is in its set state, and cores 11A and 12A are in their clear states.

Upon the occurrence of the third count pulse, cores 11A and 11B are again driven to their one states. The reset pulse source thereafter provides an output, which returns core 11A to its clear state. As a result, at the end of the third count cycle, cores 11B and 12B are in their one states and cores 11A and 12A are in their clear states.

The fourth count pulse causes core 11A to be driven to its set state and enables transistor 30 to drive core 12A to its set state. Core 12B, which is already in its set state, remains unaffected; however, core 11B is driven back to its clear state. When core 12A alone is driven to its set state, it can cause transistor 32 to become conductive. It should be noted that the winding 46 has portions coupled to the respective cores 12A and 12B with the same respective turns ratios as were described for the winding 38. Upon transistor 32 becoming conductive, it drives both cores 13A and 13B to their set states and core 15 to its clear state in a blocking oscillator action. The next reset pulse drives cores 11A, 12A, and 13A back to their clear states and core 15 to its set state. Thus, at the end of the fourth count cycle, cores 12B and 13B are in their one states and core 11B is at its clear state.

The fifth pulse that is emitted by the count pulse source 24 serves to drive cores 11A and 11B to their set states. The next reset pulse drives core 11A back to its clear state. Thus, at the end of the fifth count cycle, cores 11B, 12B, 13B are all in their set states.

The sixth count emitter by the count pulse source 24 drives core 11A to its set state, whereby transistor 30 is again enabled to drive core 12A to its set state and to drive core 11B back to its clear state. When core 12A is driven to its set state, it can enable transistor 32 to again apply a drive current to the winding 54. However, this time, since the core 13B is already in its set state, only core 13A will be driven to its set state. Core 15 is driven to its clear state. The drive of core 13A alone to its set state enables transistor 34 to become conductive. Transistor 34 thereafter can drive cores 14A and 14B to their set states and can drive core 13B to its clear state. The next reset pulse will drive cores 11A, 12A, 13A, and 14A back to their clear states and core 15 to its set state. Thus, at the end of the sixth count cycle, cores 11B and 13B are in their clear states and 12B and 14B are in their set states.

The application of the seventh count to the input stage of the counter, followed thereafter by the reset pulse, results in core 11B being left in its set state at the conclusion of the seventh count cycle. Of course, cores 12B and 14B are also left in their set states.

The application of the eight count to the counter-input state enables transistor 30 to drive core 12A to its set state. Core 12B is already in its set state. Core 11B is cleared. Since core 12B was already in its set state, the transfer of core 12A from its clear to its set state enables transistor 32 to drive cores 13A, 13B, and 15 to their set states. The next reset pulse clears cores 11A, 12A, and 13A. Thus, at the end of the eighth count, core 11B is in its clear state and cores 12B, 13B, and 14B are in their set states.

The application of the ninth count, followed by the reset pulse, leaves core 11B in its set state along with cores 12B, 13B, and 14B.

The application of the tenth count causes transistor 30 to conduct and thus drives transistor 32 and clears core 11B. Transistor 32 conducts and drives transistor 34. Transistor 34 conducts and drives transistor 35 and clears core 13B. Transistor 35 conducts and drives a succeeding stage (if there is one) and also clears core 14B and core 12B through winding 72. The entire decade is now cleared and ready to count from zero again.

The entire counter may be cleared or reset at any time by exciting the winding 20A, 20B from the clear counter pulse source 20.

| | Cores | | | | Input Pulse Count |
|---|---|---|---|---|---|
| | 14B | 13B | 12B | 11B | |
| | 0 | 0 | 0 | 0 | 0 |
| | 0 | 0 | 0 | 1 | 1 |
| | 0 | 0 | 1 | 0 | 2 |
| | 0 | 0 | 1 | 1 | 3 |
| −2 | 0 | 1 | 1 | 0 | 4 |
| | 0 | 1 | 1 | 1 | 5 |
| −2 | 1 | 0 | 1 | 0 | 6 |
| | 1 | 0 | 1 | 1 | 7 |
| −2 | 1 | 1 | 1 | 0 | 8 |
| | 1 | 1 | 1 | 1 | 9 |

The above table shows the state of the four binary elements during a scale ten-count cycle. It is obvious from the literature on binary counters that the four binary stages shown without feedback will scale the number 16. Converting this counter to a scale-ten counter is mechanized by the previously described feedback arrangement, which eliminates six counts. These six counts are eliminated as: two on the fourth input pulse, two on the sixth input pulse, and two on the eighth input pulse.

The connections of the transistors 30, 32, 34 to the cores is such that a blocking oscillator circuit operation occurs. This may be seen from the fact that the collector of the transistor 30, for example, is coupled through the winding 40 to the core 11B, which, in being driven to its clear state, induces a voltages in the winding 38 with the polarity to turn on the transistor 30. Thus, for any trigger pulse to the transistors, they will emit a fixed output pulse. The interrogation apparatus 23 can determine the count in the counter through any of several methods well known in the art for nondestructively reading the state of magnetic remanence of a multiaperture core.

There has been accordingly described and shown a novel, useful, and unique circuit arrangement for a counter which employs only solid-state devices. The counter is efficient in its utilization of power and in view of the circuitry employed whereby the coupling between stages is effectuated by transistors, the counter can be extended to have any desired capacity.

We claim:

1. A counter circuit for counting pulses from a source comprising a plurality of magnetic cores each having two stable states of magnetic remanence, respectively designated as the clear and set states, and being drivable from one to the other thereof, means for applying count pulses to a first and second of said plurality of magnetic cores for driving them from their clear to their set states if not already in their set states, a first normally inoperative means coupled to second, third, and fourth, of said plurality of magnetic cores to drive said third and fourth cores to their set states and to drive said second core to its clear state, coil means coupled to said first and third cores for driving them to their clear states after each count pulse, means for deriving an output from said first core when it alone is driven to its set state by said means for applying count pulses, and means for applying said output to said first normally inoperative means to render it operative.

2. A counter circuit for counting pulses as recited in claim 1 wherein a second normally inoperative means is coupled to a fifth and sixth of said plurality of cores to drive them to their set states and is coupled to a seventh of said cores to drive it to its clear state, said coil means being also coupled to said fifth and seventh cores to respectively drive them to their clear and set states after each count pulse, means for deriving an output from said third core when it alone is driven to its set state by said first normally inoperative means, means for applying said output from said third core to said second normally inoperative means to render it operative, a third normally inoperative means coupled to an eighth and ninth of said plurality of cores to drive them to their set states and to said sixth core to drive it to its clear state, said coil means being also coupled to said eighth core to drive it to its clear state after each count pulse, means for deriving an output from said fifth core when it alone is driven to its set state by said second normally inoperative means, and means for applying the output derived from said fifth core to said third normally inoperative means to render it operative.

3. A counter circuit for counting pulses from a source comprising a plurality of count stages in sequence each count stage including a first and second magnetic core, each said first and second magnetic core having two stable states of magnetic remanence, respectively designated as the clear and set state, and being drivable from one to the other thereof, means for applying count pulses to the first and second cores in a first count stage in said sequence of count stages for driving both cores in the first count stage from their clear to their set states, if not already in their set states, means for driving the first cores in all of said plurality of stages to their clear states after each count pulse from said source, a plurality of normally inoperative means a different one of which is coupled to the cores of different pairs of stages for driving the first and second cores of a succeeding stage of a pair to their set state if not already set and for driving the second core of a preceding stage of a pair to its clear state, a separate means for each first core in each of said stages for deriving an output from said first core when it alone is driven from its clear to its set state, and means for applying the output derived from each said first core to each normally inoperative means coupled to the second core in the same stage as each first core to render said normally inoperative means operative.

4. A counter circuit as recited in claim 3 wherein each said means for deriving an output from a first core when it alone is driven from its clear to its set state includes a first winding coupled to a first core with one sense and to a second core in the same stage with an opposite sense; each said normally inoperative means includes a transistor, a second coil means connected to said transistor to receive output therefrom and coupled to the first and second cores of a succeeding stage of a pair of stages with one sense and to the second core of a preceding stage of a pair of stages with the opposite sense.

5. A counter circuit for counting pulses from a source comprising a plurality of magnetic cores each magnetic core having two stable states of magnetic remanence, respectively designated as the clear and set state, and being drivable from one to the other thereof, each magnetic core having a toroidal ring shape with a central main aperture and a plurality of small apertures in the ring of said toroid, means for applying count pulses to a first and second of said plurality of magnetic cores for driving them to their set states if not already in their set states including a first drive winding wound in one sense on the portions of said first magnetic core between one of its small apertures and its main aperture, between another of its small apertures and its main aperture, thereafter wound with said one sense on the portions of said second magnetic core between one of its small apertures and its main aperture and between another of its small apertures and its main aperture, an output winding coupled to said first and second cores with an opposite sense, a transistor having base, emitter, and collector electrodes, a resistor connected between the ends of said output winding, means connecting said transistor base to one end of said resistor and said transistor emitter to the other end of said resistor, the relative sense of the coupling of said output winding on said first and second cores being such that said transistor is rendered conductive only by the output induced in said output winding when said first core alone is driven from its clear to its set state, means for driving a third and fourth of said plurality of magnetic cores to their set states if not already set and said second magnetic core to its clear state from the output of said transistor including a second drive winding connected to said transistor collector, said second drive winding being wound in one sense on the portions of said third magnetic core between one of its small apertures and its main aperture, between another of its small apertures and its main aperture, thereafter being wound with said one sense on the portions of said fourth magnetic core between one of its small apertures and its main aperture, between another of its small apertures and its main aperture and thereafter being wound on said second magnetic core through its main aperture, and means for driving said first and third cores to their clear states after each count pulse from said source including a clear winding coupled to said first and third cores through their main apertures.

6. A counter circuit for counting pulses from a source comprising first, second, third, and fourth count stages each including a first and second magnetic core, a third magnetic core, each said first and second magnetic cores and said third magnetic core having two stable states of magnetic remanence respectively designated as the clear and set states, said cores being drivable from one to the other state, means for applying count pulses to the first and second cores and in said first stage for driving them to their set state if not already set, reset winding means coupled to the first magnetic cores in said first, second, third, and fourth count stages for driving these cores to their clear state after each count pulse and coupled to said third core for driving it to its set state after each count pulse, means for driving the first and second cores in said second stage to their set states and the second core in said first stage to its clear state responsive to only the first core in said first stage being driven to its set state including a first output winding coupled to the first and second cores in said first stage with opposing sense, a first transistor, means to apply said first output winding output to said first transistor to render it conductive, and a first driving winding connected to said first transistor to be driven by output therefrom, said first driving winding being coupled to the first and second cores of said second stage with one sense and to the second core of said first stage with an opposite sense, means for driving the first and second cores in said third stage to their set states and the third core to its clear state responsive to only the first core in said second stage being driven to its set state including a second output winding coupled to the first and second cores in said second stage with opposing sense, a second transistor, means to apply said second output winding output to said second transistor to render it conductive, and a second driving winding connected to said second transistor to be driven by output therefrom, said second driving winding being coupled to the first and second cores of said third stage with one sense and to said third core with an opposite sense, means for driving the first and second cores in the fourth stage to their set state and the second core in the third stage to its clear state responsive to only the first core in said third stage being driven to its set state including a third output winding coupled to the first and second cores in said third stage with an opposing sense, a third transistor, means to apply output from said third driving winding to said third transistor to render it conductive, and a third driving winding connected to said third transistor to be driven therefrom, said third driving winding being coupled to the first and second cores of said fourth stage with one sense and to the second core of said third stage with an opposite sense.

References Cited in the file of this patent

UNITED STATES PATENTS

| | | |
|---|---|---|
| 2,735,021 | Nilssen | Feb. 14, 1956 |
| 2,805,409 | Mader | Sept. 3, 1957 |
| 2,946,988 | Michle | July 26, 1960 |